US010891837B2

(12) United States Patent
Robinson

(10) Patent No.: US 10,891,837 B2
(45) Date of Patent: Jan. 12, 2021

(54) MONITORING OPERATIVES IN HAZARDOUS ENVIRONMENTS

(71) Applicant: Wearable Technology Limited, Leicester (GB)

(72) Inventor: Jack Stephen David Robinson, Leicester (GB)

(73) Assignee: Wearable Technology Limited, Leicester (GB)

( * ) Notice: Subject to any disclaimer, the term of this patent is extended or adjusted under 35 U.S.C. 154(b) by 0 days.

(21) Appl. No.: 16/587,129

(22) Filed: Sep. 30, 2019

(65) Prior Publication Data

US 2020/0105110 A1    Apr. 2, 2020

(30) Foreign Application Priority Data

Sep. 28, 2018 (GB) .................................. 1815855.0

(51) Int. Cl.
| | |
|---|---|
| *G08B 5/00* | (2006.01) |
| *G08B 5/38* | (2006.01) |
| *A41D 1/00* | (2018.01) |
| *A41D 13/01* | (2006.01) |
| *A41D 27/08* | (2006.01) |
| *A41D 27/20* | (2006.01) |
| *G08B 29/18* | (2006.01) |

(Continued)

(52) U.S. Cl.
CPC ................ *G08B 5/38* (2013.01); *A41D 1/005* (2013.01); *A41D 13/01* (2013.01); *A41D 27/085* (2013.01); *A41D 27/205* (2013.01); *G08B 5/004* (2013.01); *G08B 29/181* (2013.01); *H04W 52/14* (2013.01); *H04W 72/0413* (2013.01)

(58) Field of Classification Search
CPC . G08B 5/38; G08B 21/02; G08B 5/36; A41D 13/01; A41D 1/04; A41D 1/005; A41D 27/205
See application file for complete search history.

(56) References Cited

U.S. PATENT DOCUMENTS 9,922,519 B2 *  3/2018  Bernstein ............. G08B 25/009
10,311,712 B2 *  6/2019  Jurkuvenas ............ H05B 47/19
10,497,244 B2 * 12/2019  Bernstein ........... G08B 21/0453
(Continued)

FOREIGN PATENT DOCUMENTS

WO      2018185449 A1     10/2018

*Primary Examiner* — Toan N Pham
(74) *Attorney, Agent, or Firm* — Cooper Legal Group, LLC

(57) ABSTRACT

Operatives are monitored in a hazardous environment. A control unit is connected to a wiring loom embedded within an item of clothing having illuminatable devices and interface connectors. A monitoring device is connected to an interface connector and a radio device is connected to an interface connector. The control unit is activated to supply power to the connected monitoring device and the connected radio device. Condition data is conveyed from the monitoring device to the control unit. Uplink signals are transmitted from the control unit to a base station via a cellular radio communication module. Downlink signals are received at the control unit from the base station. Condition data is transmitted via the cellular radio communication module when the downlink signals are being received. Condition data is transferred to the non-cellular radio device when the downlink signals are not being received, for transmission to the base station.

19 Claims, 16 Drawing Sheets

(51) Int. Cl.
    *H04W 52/14*     (2009.01)
    *H04W 72/04*     (2009.01)

(56) References Cited

U.S. PATENT DOCUMENTS

| | | | |
|---|---|---|---|
| 10,641,261 B2* | 5/2020 | Inoue | F04B 39/121 |
| 2001/0024949 A1* | 9/2001 | Yanagida | H04M 11/04 |
| | | | 455/404.2 |
| 2005/0001728 A1* | 1/2005 | Appelt | G08B 21/182 |
| | | | 340/573.1 |
| 2015/0176825 A1 | 6/2015 | Bernstein | |
| 2016/0209016 A1 | 7/2016 | Bernstein | |
| 2018/0301012 A1* | 10/2018 | Carlson | B61L 25/025 |
| 2019/0037934 A1* | 2/2019 | Swank | A41D 13/01 |

\* cited by examiner

MONITORING OPERATIVES IN HAZARDOUS ENVIRONMENTS

CROSS REFERENCE TO RELATED APPLICATIONS

This application claims priority from United Kingdom Patent Application number 1815855.0, filed on Sep. 28, 2018, the whole contents of which are incorporated herein by reference.

BACKGROUND OF THE INVENTION

The present invention relates to a system for monitoring operatives in hazardous environments. The present invention also relates to an apparatus for monitoring an operative in a hazardous environment and a method of monitoring an operative in a hazardous environment.

It is known for uniformed personal to operate in dangerous conditions and significant measures may be taken in order to maintain appropriate communication. In particular, the cost of equipment will be appropriate for the operations to be performed, particularly given that uniformed operatives often experience life-threatening dangerous conditions routinely when performing their assigned duties. The environment experienced by a firefighter for example will always be dangerous.

Hazardous environments may be identified as those that present hazards but, under normal operating conditions, these hazards should not be encountered during the primary operations performed by the operatives involved. Thus, toxic gases should not be encountered when working underground, items should not fall when working on building sites and noise levels should be constrained within acceptable levels. However, unforeseen situations occasionally arise and procedures are required to deal with these. Furthermore, an increasing burden has been placed on supervisory functions to ensure that appropriate safety measures are taken when working in hazardous conditions; otherwise the supervisory function itself could be held liable for any injuries to operatives following encounters with hazards. Thus, these procedures should aim to reduce the risk of a hazard causing harm to an operative, while at the same time recording data to provide evidence of procedures being followed.

It is also known for operatives to wear protective clothing when working in hazardous conditions and recently there has been a trend towards increasing the visibility of this clothing. Thus, standards now exist in many jurisdictions specifying the nature of high visibility garments that are required to include florescent areas and light reflective strips. Furthermore, in some environments, there has been a move towards including light emitting devices on high visibility garments of this type, usually in the form of clusters of light emitting diodes. Clusters of this type may be individually powered but advantages can be gained from providing a shared power source, such that this source may be removed for cleaning purposes etc. Problems associated with the inclusion of wiring between a control unit and light emitting diodes are addressed in US 2015/0176825 assigned to the present applicant. Furthermore, problems associated with activating control units of this type are addressed in US 2016/0209016, also assigned to the present applicant.

Having established an item of clothing in which it is possible to provide light emitting devices, the effectiveness of these devices may be enhanced if they can be made to flash or change color when a particular hazard has been detected. To achieve this, it is necessary for a loom of wires to include data wires and, so that control data may be conveyed from the control unit to the individual clusters. Furthermore, once a communication channel of this nature has been established, it is possible for other data-communicating devices to be incorporated within what becomes a personal area network. Devices attached to a loom of this type may receive power from the loom (like the light emitting diodes), receive power from a local battery source or have the option to selectively receive power from the local or the connected source and possibly use the connected power source to recharge the local power source, as disclosed in U.S. Pat. No. 10,311,712, assigned to the present applicant.

In many situations, a group of operatives will work collectively in an environment that includes potential hazards, each having an item of clothing with its own personal area network. Thus, when working in this way, it is possible to establish communications between individual personal area networks to create what may be considered as a local area network. In this way, items of clothing themselves are in a position to communicate automatically, without the direct involvement of the operatives. Thus, having detected a hazard at a first location, it is possible for this information to be conveyed to other operatives, automatically via their clothing, thereby allowing them to take appropriate action, as disclosed in U.S. Pat. No. 9,922,519.

Thus, the primary role of safety equipment is to protect operatives and assist them in terms of avoiding hazards. However, a secondary feature, is to collect data relating to the operating conditions. Issues associated with the local collection of data are addressed in PCT/GB2018/000056, providing additional storage that is associated with the loom side of the apparatus, such that when a control unit is detached, stored data stays with the item of clothing and therefore remains associated with a particular operative. Control units are then interchangeable after recharging exercises and are reprogrammed upon installation, possibly by deriving instructions from the storage device within the item of clothing itself.

It is therefore known to record operational data for downloading later, such that a historical record is maintained of the operations performed. Thus, should an issue arise, this stored historical data may be analysed to derive relevant evidence. However, such an approach does not facilitate the communication of real-time data, possibly in the form of hazard alerts from operatives or in the form of real-time instructions back from a supervisory function. To achieve this, it is necessary to extend the local area network to a wide area network. In many environments, suitable infrastructure is in place in the form or commercially available cellular telephony systems, referred to herein as public cellular networks.

The present applicant has been developing systems in which wide area communication devices have been included within loom-connected control units. Thus, using established protocols, a control unit may receive data from devices attached to the data loom (referred to herein as peripheral devices) store this data locally and transmit the data to a supervisory function. At the supervisory function, appropriate graphical displays may be established to facilitate the monitoring of operatives when working in hazardous conditions. At what is typically referred to as a "dashboard", graphical displays can identify the particular type of equipment being carried by each operative, along with an indication of the current functionality of that equipment. Thus, such an approach works well when public data-communication networks are available, such as that provided by cellular networks, such as GSM G2 and G4. However, operatives are often required to work in areas where public cellular networks are unreliable (due to weak signal strengths) or in area where such networks are not available at all.

To maintain communication, it is known to deploy dedicated radio transmission systems for exclusive use within the environment. Herein, these are identified collectively as non-cellular networks. Thus, in theory, it would be possible to incorporate systems within control units for allowing communication to take place within a selected non-cellular network. However, this creates a significant problem, in that many different systems of this type exist, they are often updated and new protocols are continually being introduced. Maintaining control units would therefore increase cost, introduce unnecessary redundancy and, ultimately, an inability to cover every protocol in current use.

It can be appreciated that by the establishment of a wide area network, new opportunities may arise, on the basis that it is now possible for a supervisory function to maintain continual data communication with operatives, on a real-time basis. However, if reliance is to be made on functionality within this environment, robust systems must be established to ensure that a communication is not lost. Thus, maintaining communication becomes increasing essential, but placing additional burden on control unit design becomes is not a feasible solution.

BRIEF SUMMARY OF THE INVENTION

According to an aspect of the present invention, there is provided a system for monitoring operatives in hazardous environments, comprising: a base station; items of clothing with illuminatable devices connected to a control unit by a wiring loom; condition detection devices attachable to respective items of clothing for producing condition data; and non-cellular radio devices, each attachable to a respective item of clothing, wherein: said control units include a processor and a cellular radio communication module, said cellular radio communication module is configured to communicate with said base station over a cellular network to transmit uplink signals and receive downlink signals under the control of said processor; said condition detection devices supply condition data to a connected control unit over a wiring loom; said control units transmit said condition data to said base station when said downlink signals are being received, over said public cellular network, via said cellular radio communication module; said control units transfer said condition data to a connected non-cellular radio device over said wiring loom when said downlink signals are not being received; and connected radio devices transmit condition data received from said control unit to said base station over said non-cellular radio network.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processes distinguished by ordinal phrases such as "first" and "second" do not necessarily define an order or ranking of any sort.

DETAILED DESCRIPTION OF EMBODIMENTS OF THE INVENTION

FIG. 1

Figure 1:
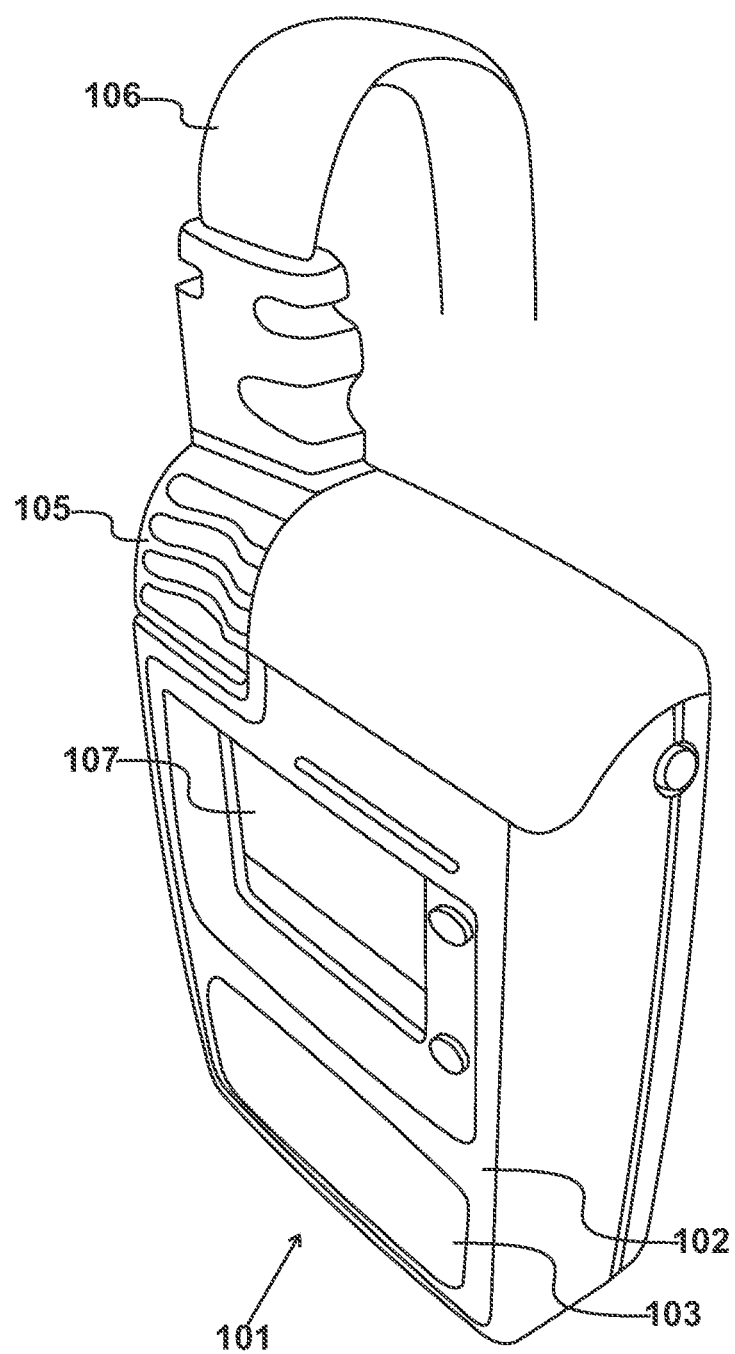
FIG. 1 shows a control unit for inclusion within an item of clothing.

A control unit 101 is shown in FIG. 1, that provides an apparatus for monitoring an operative in a hazardous environment. The control unit 101 has a first surface 102, with an over-sized activation button to facilitate manual activation while retained in a pocket, as described in US 2016/0209016 A1, assigned to the present applicant.

A loom socket receives a loom plug 105 that is in turn connected to an extended portion 106 of a loom. The loom also includes a concealed portion that is retained within an item of clothing. A visual display is also included to display information to an operative.

FIG. 2

Figure 2:
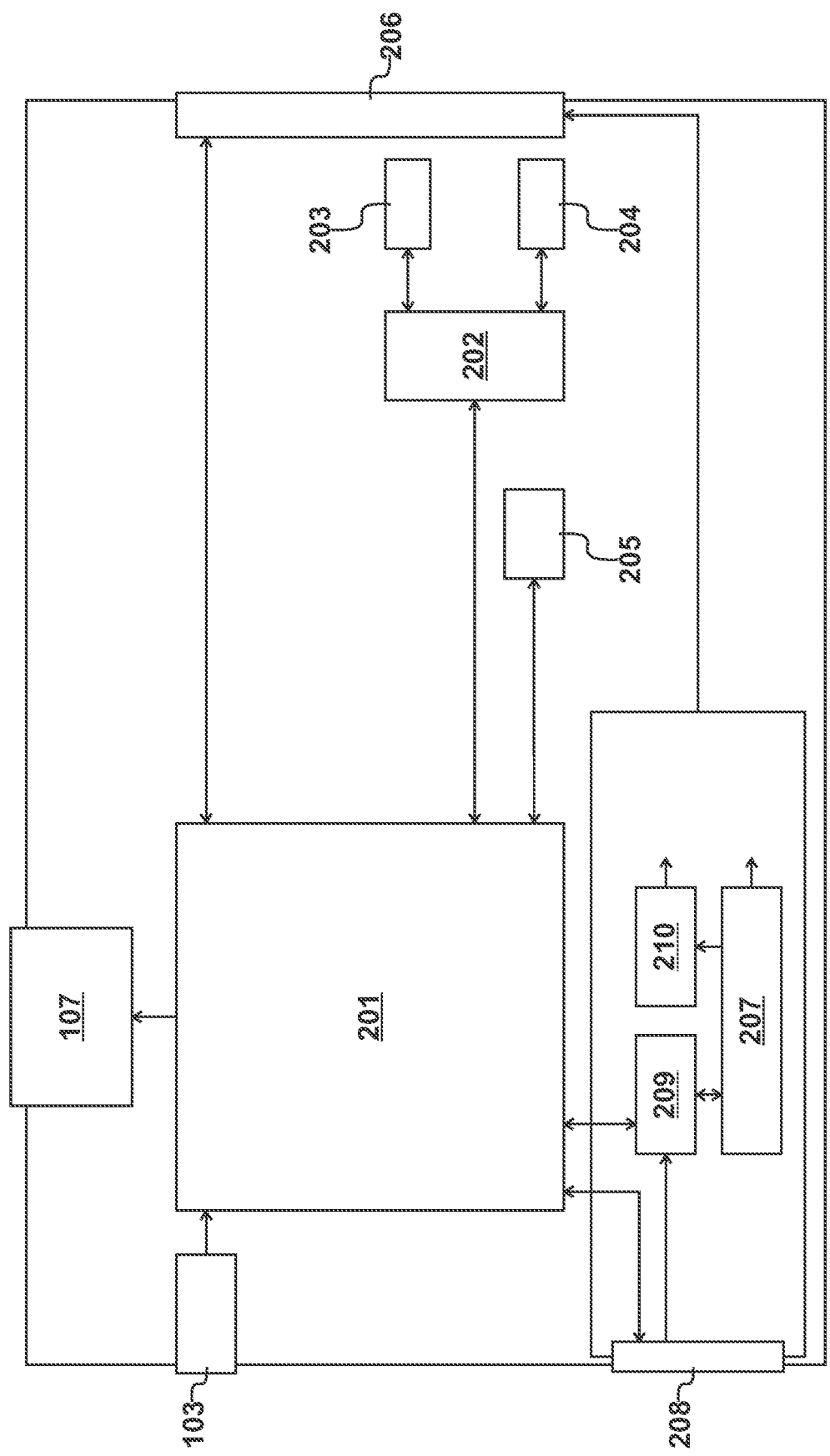
FIG. 2 shows a schematic representation of the control unit identified in FIG. 1.

A schematic representation of the control unit 101 of FIG. 1 is shown in FIG. 2. The control unit 101 includes a processor 201, implemented as a microcontroller with on-chip data storage. A cellular radio communication module is provided for communicating with a remote base-station, forming part of the operational system. In an embodiment, the cellular radio communication module may operate using a private network or, in most environments, a public network, such as those established primarily for mobile telephony. Many standards are available for operating in this way, such as GSM G4 DATA and the device may be capable of multi-mode operation, to allow compatibility with public networks operating over the different working areas.

In some implementations, as described in PCT/GB2018/000056, multiple communication systems may be included within the control unit, such as Bluetooth enabled systems and near field systems. In earlier versions, these systems were required to facilitate data communication between devices attached to an item of clothing of a personal area network. Furthermore, communication protocols of this type were also required to interface peripheral devices to the personal area network, particularly when these devices have been designed to work in a standalone configuration.

In a current embodiment, it is envisaged that peripheral devices would be designed and implemented in order to work within the personal area networks described herein. Consequently, it is possible to reduce requirements placed on control units, which in turn reduces costs and improves reliability. Such an approach also conserves power, such that power stored within the control unit may be deployed for operational activities.

The processor 201 controls a cellular radio communication module 202 and in turn has an antenna 203 and a cellular SIM card 204. The unit also includes an e-compass module 205 used to generate movement data that, in particular, may be used to identify a fall. A loom socket 206, supplies power and data to devices connected to the loom and, where appropriate, receives data from devices connected to the loom.

In an embodiment, a lithium polymer cell 207 is charged from a micro USB port 208 via a charge controller 209. A regulated output of three volts is provided by a voltage regulator 210 but peripheral devices receive a direct output from cell 207 that typically has a voltage of around three point seven volts (3.7V). The processor 201 receives input commands from the activation button 103 and supplies output data to the visual display 107.

FIG. 3

Figure 3:
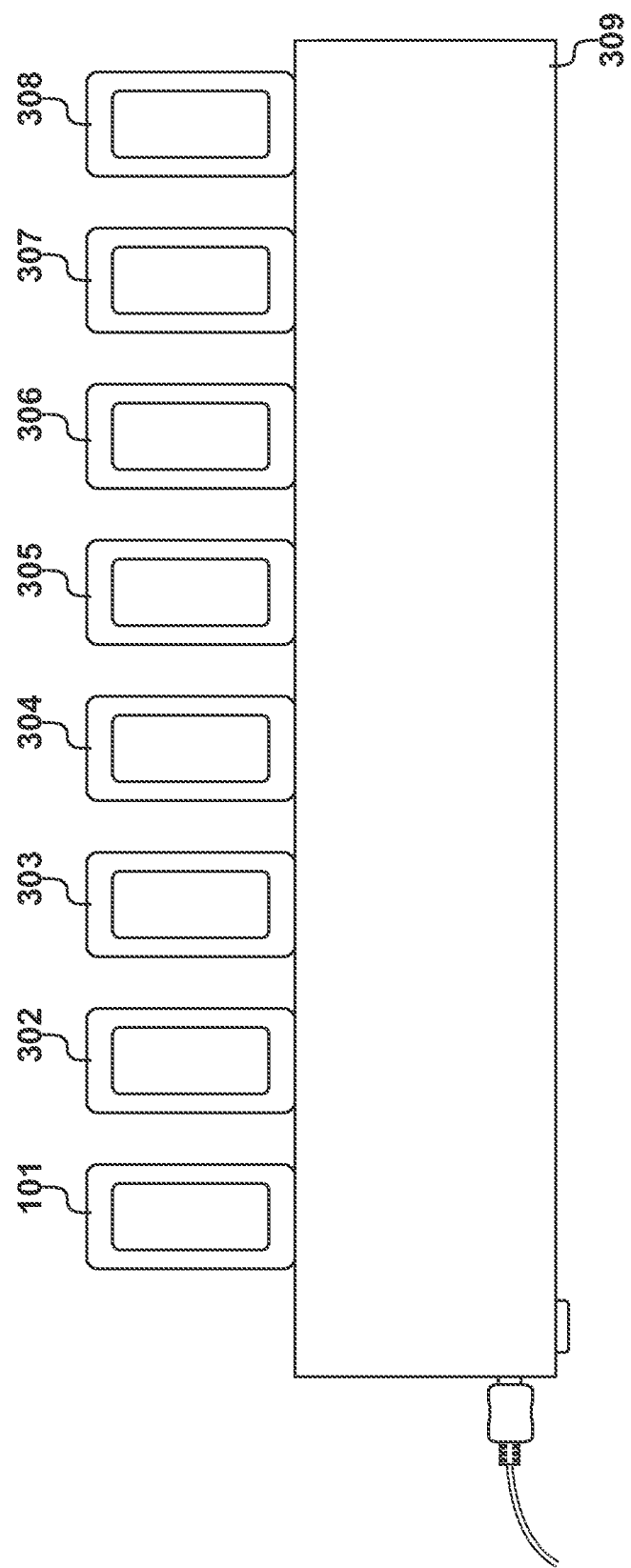
FIG. 3 shows the control unit of FIG. 1 being charged, long with similar units.

Control unit 101 is shown in FIG. 3, along with similar control units 302 to 308, connected to a bulk charging unit 309. During an operational period, the control unit 101 will have associated with a particular item of clothing and will have paired with peripheral devices. If communication with the base station is lost during an operational period, this pairing information is retained, so that communication may be re-established. However, upon insertion of a control unit into the bulk charging unit 309, this pairing data is erased such that, at the start of a new shift, the whole association and pairing exercise may be repeated with a different item of clothing and with different peripheral devices.

It is assumed that operatives will retain the same item of clothing (which may have been selected for size and fit etc.) but they may select any appropriate control unit and may select any appropriate peripheral device. Furthermore, it is not necessary for operatives to perform any complex procedures to achieve the required pairings. In an embodiment, peripheral devices are configured for operation within the environment of the personal area network, to facilitate communication upon connection in a manner usually referred to as "plug-and-play". Consequently, upon being poled, data is returned and attributes of the loom itself are conveyed to a newly connected control unit from data retained within a data circuit, as described with reference to FIG. 7, such that the control unit is made aware of the capabilities of the loom and the type of devices that are likely to be connected.

FIG. 4

After the control unit 101 has been charged, it is connected to a loom plug 105, such that it is then in a position to power active devices, such as a first light emitting device 401.

FIG. 5

Figure 4:
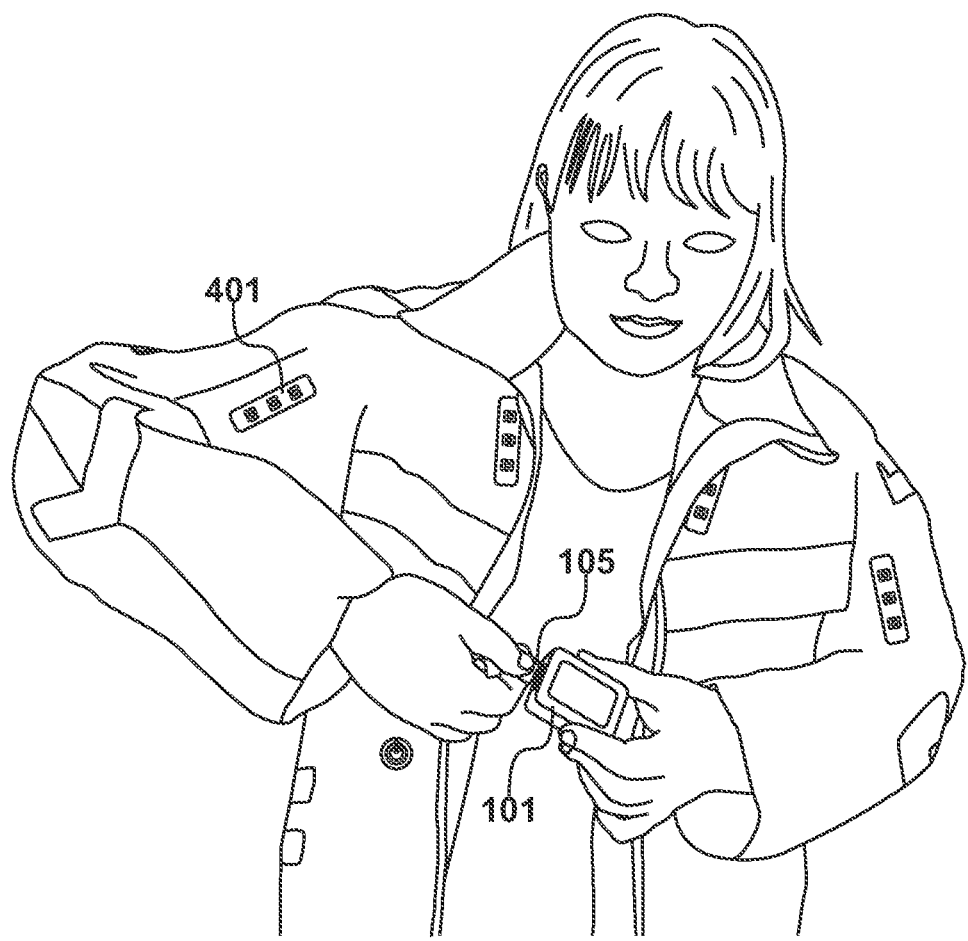
FIG. 4 shows the control unit of FIG. 1 being connected to a loom plug.

After connection, as described with reference to FIG. 4, the control unit 101 is inserted within an internal pocket 501 of an item of clothing 502.

FIG. 6

A loom, embedded within an item of clothing, includes connected loom subassemblies. A circuit board receives a rigid connector 601 that is configured to provide a physical connection and electrical connections to an attached peripheral device. The combination of circuit board, connector 601, an end of a first loom portion 602 and an end of a second loom portion 603 are over moulded in rubber to provide an over-moulding 604. Over-moulding 604 includes a first strain relief portion 605 and a similar second strain relief portion 606.

The over-moulding 604 includes a first side flange 607 and a second side flange 608, that may be glued to an underside of an item of clothing. The over-moulding 604 also includes a moulding orifice 609 for receiving the rigid connector 601. Furthermore, an outer cover 610 is provided that includes a similar cover orifice 611 for receiving the rigid connector. The outer cover 610 also includes indications 612 for receiving stitches, such that the stitches extend through the outer cover 610, the fabric of an item of clothing 612 and the over-moulding 604.

The loom portion 602/603 may be a silicone rubber insulated ribbon cable. The silicone rubber provides a hardwearing insulation that also protects loom conductors during washing cycles. Thus, the loom becomes a permanent subassembly forming part of the item of clothing. External peripheral devices are then connected and supported by the electrical connectors when required but removed for washing and storage.

Mechanical attachment of a peripheral device is maintained by an interference fit over a mechanical lip 613. Electrical connection to peripheral devices is achieved via four concentric electrodes 614. Thus, in this way, after a peripheral device has been attached to the connector 601 and restrained by the lip 613, it is possible for the peripheral device to rotate while still maintaining electrical connection with concentric electrodes 614.

FIG. 7

Figure 7:
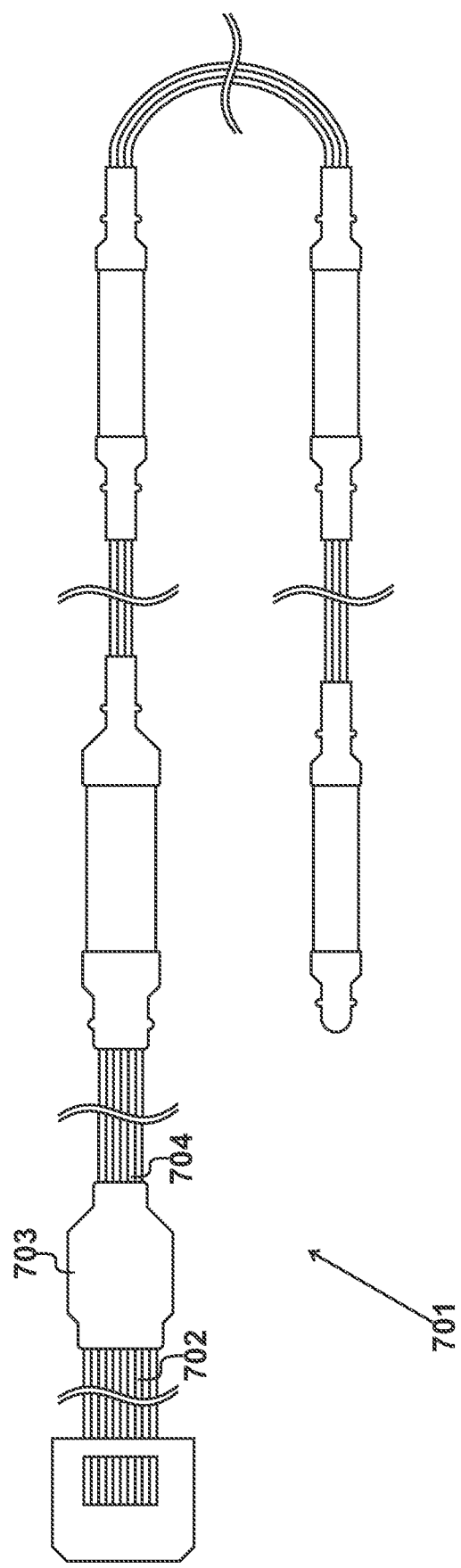
FIG. 7 shows a loom for inclusion within an item of clothing.

A loom 701 for inclusion within an item of clothing is illustrated in FIG. 7. An extended loom portion 702 connects a loom-plug to an encapsulated interface circuit 703, which in turn connects to an embedded loom portion 704. Consequently, the encapsulated interface circuit 703 is embedded within the item of clothing itself.

Figure 6:
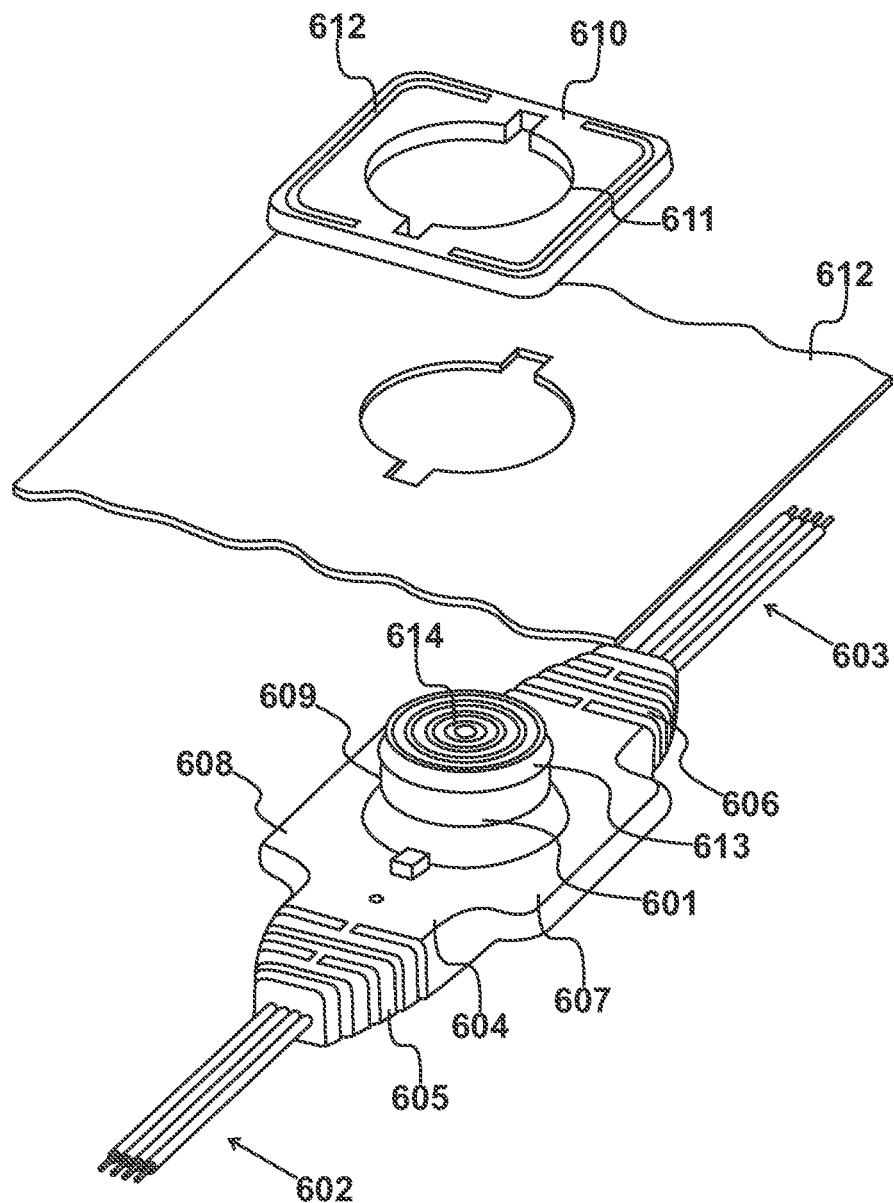
FIG. 6 illustrates connectors for peripheral devices.

The encapsulated interface circuit 703 includes a memory device for storing operational instructions for influencing the functionality of a removable control unit. This functionality includes energising clusters of light-emitting diodes supported by printed-circuit-board strips, in combination with communicating with peripheral devices connected to encapsulated rigid connectors, of the type described with reference to FIG. 6. In addition, the encapsulated interface circuit 703 is also configured to store operational data when the item of clothing is in use. From the perspective of the present invention, this effectively provides a fall-back position and ensures that all operational data is retained. However, the present invention in primarily directed towards the real time transmission of this operational data, thereby allowing the data to be acted upon in real time in response to real time alerts and emergencies.

FIG. 8

Figure 8:
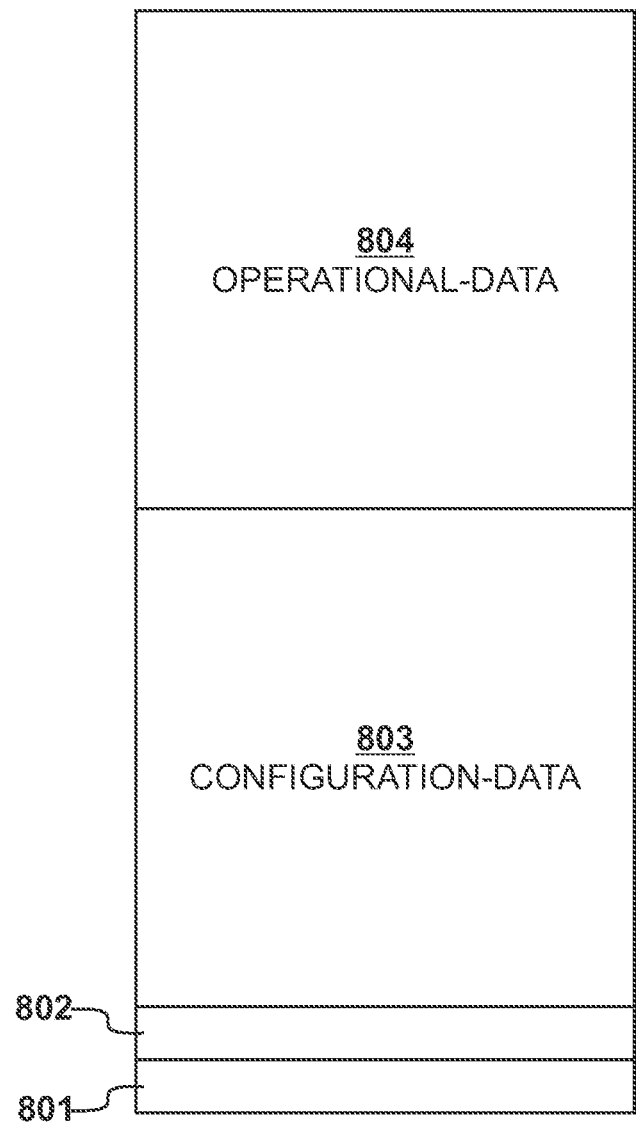
FIG. 8 shows an encapsulated interface circuit.

The encapsulated interface circuit 703 includes a data storage device and a memory map for this data storage device is illustrated in FIG. 8. In an embodiment, the data storage device has a capacity of thirty-two kilobytes. A first region 801 of one kilobyte is reserved for first test data produced at a loom factory. A second region 802 of one kilobyte is reserved for second test data and third test data produced at the garment factory. Thus, looms may be tested at the garment factory before they are inserted within the garment and then further tests may be performed after the looms have been inserted within the garment.

A third region 803 of fifteen kilobytes is reserved for configuration data. This is read by a control unit when the control unit is attached, such that the control unit is then in the position to operate as required for the particular type of loom connected. This may in turn control the color of light emitting devices and light-flashing cadences. Furthermore, the data identifies the type of peripheral devices that may be connected. Consequently, it is then possible for the control unit to perform polling exercises, such that the connection of a new peripheral device may be identified and communication with that device established.

A fourth region 804 of thirty-one kilobytes is reserved for operational data. This provides sufficient capacity for data to be stored for a twelve-hour operational shift on an item of clothing typically having four peripheral devices attached, including a secondary communication device. Thus, should an incident occur, in addition to real time activities being monitored, it is also possible for the stored data to be reviewed.

FIG. 9

Figure 9:
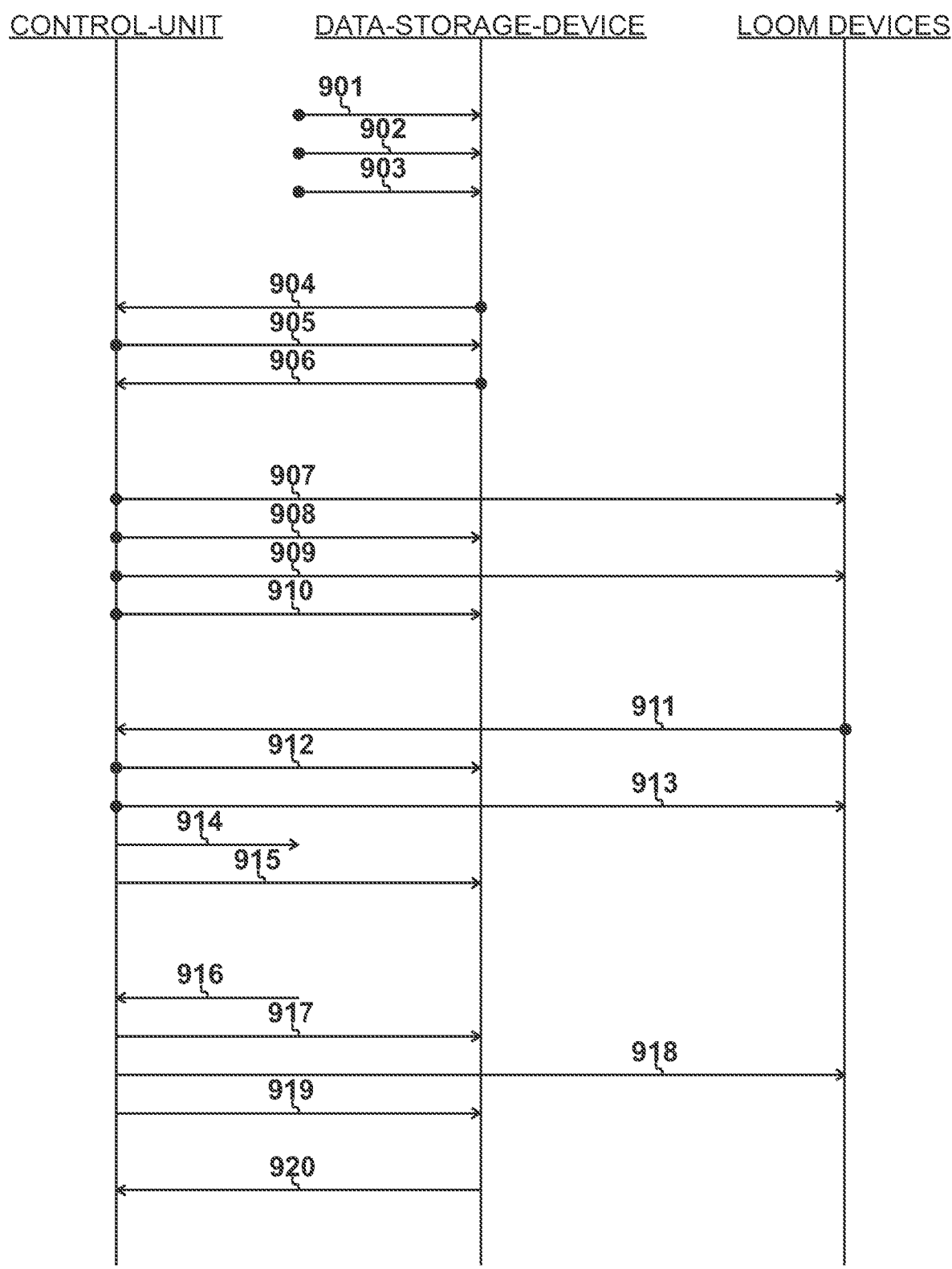
FIG. 9 shows a protocol diagram illustrating communications.

A protocol diagram illustrating communications between a control unit, a data storage device and loom-attached devices is illustrated in FIG. 9. At the loom factory, first test data 901 is written to the data storage device after performing initial tests. Thereafter, the assembled loom is transferred to a garment factory where second test data 902 is transferred to the data storage device. Third test data 903 is written to the data storage device after further testing has been performed with the loom installed within the garment. Garments with looms installed are now despatched for use by operatives.

Before a garment may be used in the field, a control unit is connected, as described with reference to FIG. 4. This results in the generation of a connect detection signal 904, transmitted from the data storage device to the control unit. In response to receiving signal 904, the control unit issues a data request 905 to the data storage device. In response to receiving the request 905, the data storage device transmits configuration data 906 to the control unit. The configuration data is installed at the control unit which now places the overall assembly in a position to be used in the field.

For the purposes of this illustration, it is assumed that a local device attached to the loom identifies an emergency condition. First alarm condition data 911 is transmitted from a peripheral device to the control unit. Again, this results in third operational data 912 being written to the data storage device. Thereafter, third device activation data 913 is transmitted from the control unit to the loom devices. Thus, under these conditions and in accordance with the configuration data, light emitting devices on the loom are caused to flash and audio warnings may also be generated. In addition, the control unit transmits external data 914 and again this position is recorded by the fourth operational data 915 written to the data storage device.

Again, for the purposes of illustration, it is assumed that an emergency condition has been identified by another operative working in the environment. In response to this condition, the control unit receives second external data 916. Fifth operational data 917 is written to the data storage device, confirming that the second external data has been received. Thereafter, fifth operational data 718 is transmitted form the control unit to the loom devices, again causing the loom devices to operate. In an embodiment, a local emergency condition results in light emitting devices being caused to flash red. In order to distinguish the type of condition detected, in an embodiment, an external remote alarm condition results in the light emitting devices being caused to flash blue or amber. Thus, the blue flashing devices may be interpreted by an operative to show that they themselves are not in immediate danger but a colleague may require assistance and a complete evacuation may be appropriate. Again, sixth operational data 619 is written to the data storage device confirming that the blue flashing of the light emitting device has been activated.

At the end of a shift, bulk operational data 920 is transferred to the control unit. The control unit is then responsible for conveying this bulk data to a central data processing system. Thereafter, the control unit is disconnected and returned to bulk charging unit 309, resulting in the control unit being reset, such that it may be selectively configured by any operative at the start of the next shift.

Thus, it is possible for the item of clothing to retain operational data. However, increasingly, this data and more are required in real time. To achieve this, a real-time-communication link must be maintained between the control unit and a base station.

FIG. 10

Figure 10:
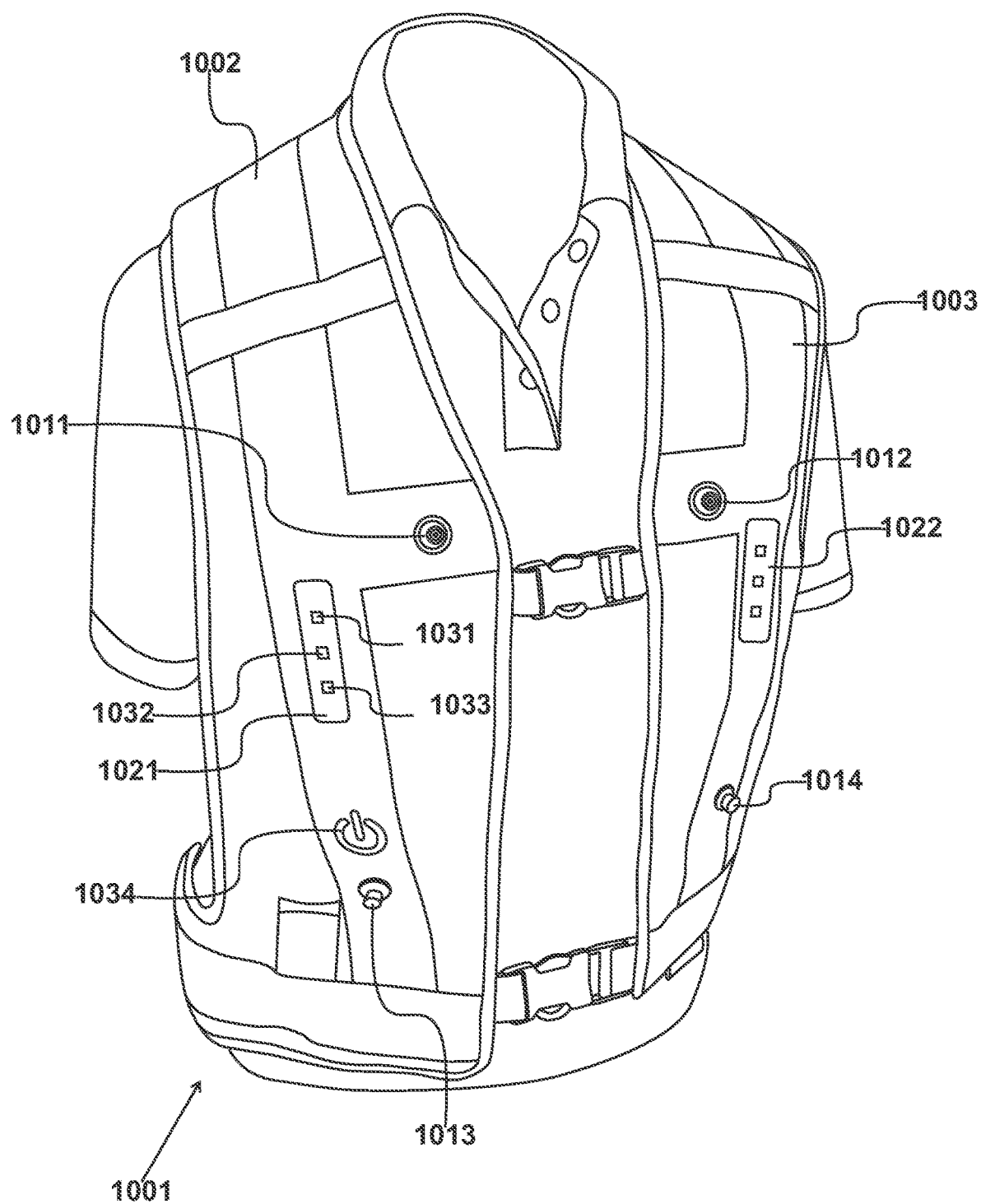
FIG. 10 shows a vest embodying an aspect of the present invention.

As an alternative to a jacket as described with reference to FIG. 4, items of clothing with illuminatable devices may take alternative forms, such as that of a vest 1001, as illustrated in FIG. 10. The vest 1001 is constructed from a fluorescent outer layer 1002 with a brace configuration of reflective strips 1003. In an embodiment, loom conductors may be restrained within seams used to construct the vest 1001. In an alternative embodiment, these conductors are restrained behind the reflective strips 1003 such that, as illustrated in FIG. 10, rigid connectors and light emitting devices may extend from an outer surface of the reflective strips 1003.

A loom, of substantially similar configuration to that described with reference to FIG. 7, has been incorporated within the vest 1001. The vest 1001 therefore has four rigid connectors, consisting of a first rigid connector 1011, a second rigid connector 1012, a third rigid connector 1013 and a fourth rigid connector 1014. However, it should be appreciated that in alternative embodiments more or fewer connectors may be included on the loom.

The vest 1001 includes four light emitting strips, comprising a first light emitting strip 1021 and a second light emitting strip 1022; with the third and fourth light emitting strips being at the rear of the vest. However, it should be appreciated that more or fewer strips of this type may be included. In this example, each light emitting strip, such as strip 1021, includes three light emitting diodes, consisting of a first light emitting diode 1031, a second light emitting diode 1032 and a third light emitting diode 1033. Again, although three light emitting diodes are illustrated in this example, more or fewer devices of this type may be included in each strip. Furthermore, it is not necessary for each strip to include the same number of devices.

Figure 5:
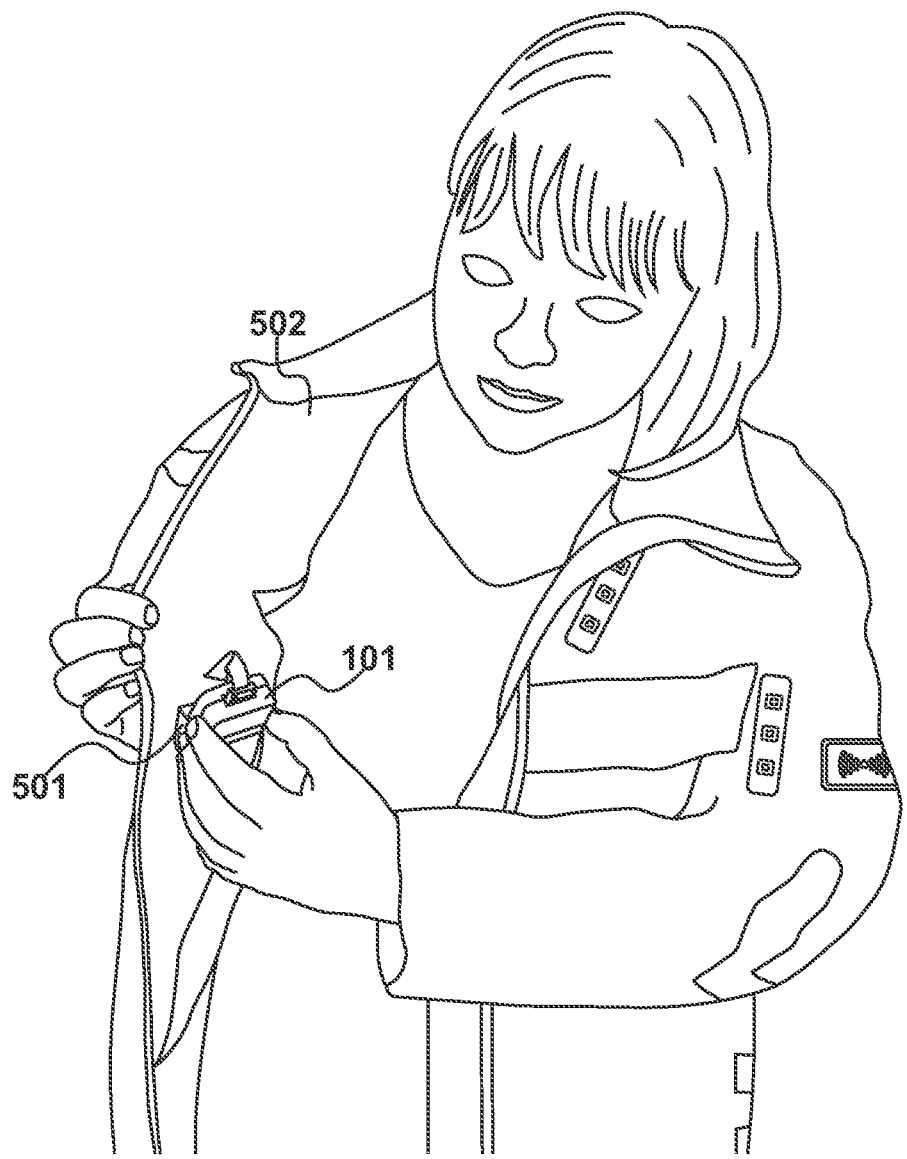
FIG. 5 shows the connected control unit being inserted within a pocket.

The vest 1001 includes an internal pocket for receiving a control unit of the type described with reference to FIG. 1. Before being placed in an internal pocket, as described with reference to FIG. 5, the loom plug is inserted into the loom socket as described with reference to FIG. 4. In this embodiment, the position of the pocket ensures that the activation button is positioned behind an activation indicator 1034 that has been printed or etched onto a reflective strip 1003.

FIG. 11

Devices suitable for attachment to rigid connectors are identified herein as peripheral devices. Some peripheral devices may include a local power supply and in addition to providing functionality when attached, functionality may be provided (by receiving power from the local power supply) when detached. Furthermore, it is possible that a first functionality is provided when attached and a different functionality is provided when detached. However, the present embodiment is primarily involved with attached peripheral devices. These attached devices may still include a local power supply to provide high levels of power when functionality is required. Thus, as an alternative from being powered directly from the loom, it is possible for loom power to provide charging current for a local battery, thereby maintaining the functionality of the peripheral devices during an operational period, without requiring operatives to perform recharging operations.

Figure 11:
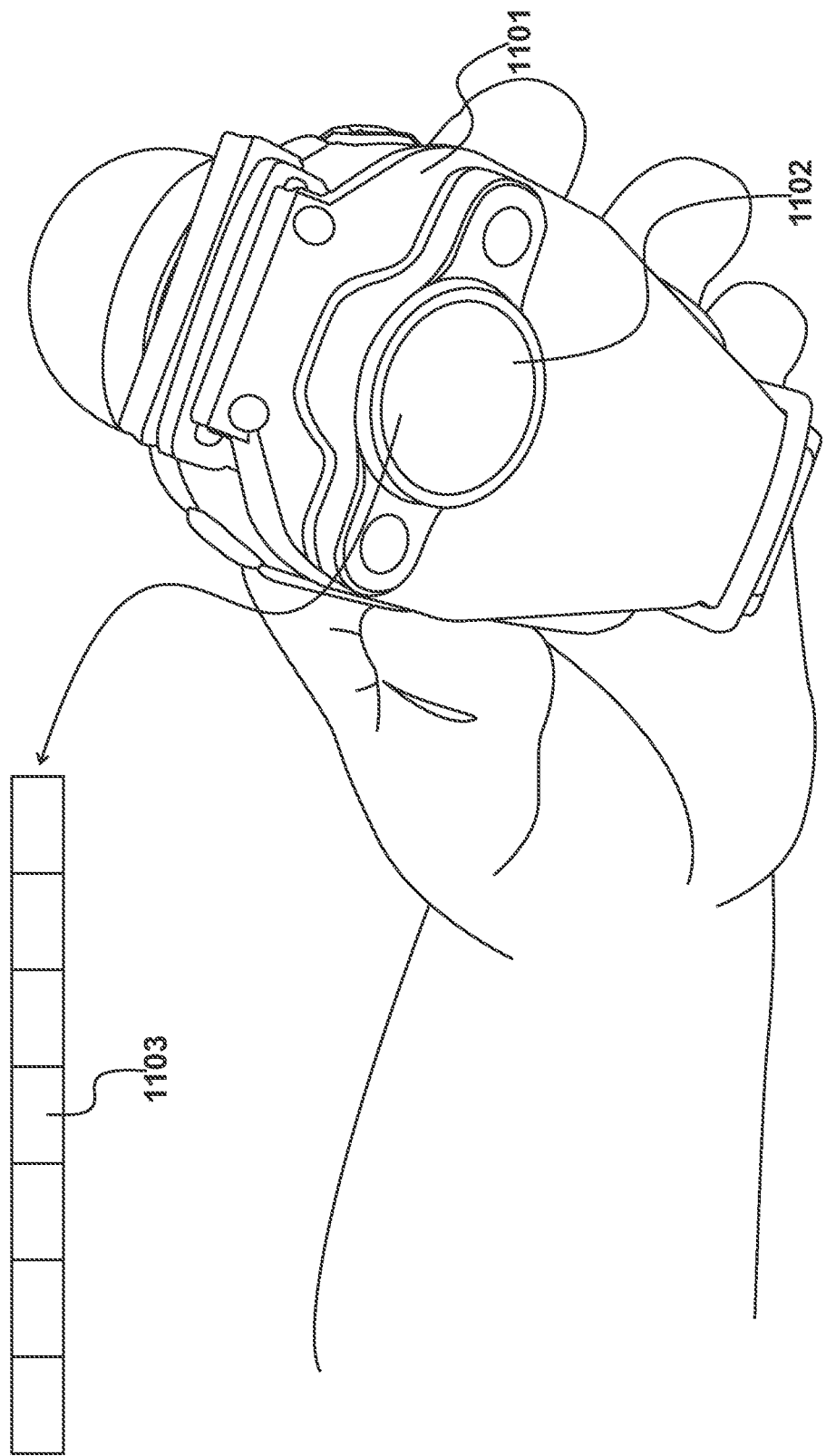
FIG. 11 shows a monitoring device.

In this embodiment, the peripheral devices may take the form of condition detectors or communication devices. FIG. 11 shows a sound level detector as an example of a condition detector. Other condition detectors may be configured to detect, non-exclusively, gas concentrations, radio activity, temperature levels, humidity levels or biomedical conditions, for example. Each includes a connector interface 1102 that facilitates physical connection to a rigid connector, such as the first rigid connector 1011. Upon connection, a peripheral device is identified by the control unit and protocols are established for achieving communication between the peripheral device and the control unit. All devices include unique codes and routines for establishing this communication link, to facilitate the provision of a plug-and-play environment. Thus, in this embodiment, it is not necessary to perform a manual pairing exercise and all communication between the control unit and the peripheral device occurs over the embedded loom.

During operation, the noise level detector 1101 generates packets of condition data 1103, indicative of an identified operating condition. Thus, in this example, the condition data 1103 provides data representing ambient noise levels and, in addition to providing a continual record of noise levels, a specific alert condition may be generated if an ambient noise level exceeds a predetermined value. Similarly, other condition detectors may operate in a similar way, in that packets of condition data are continually generated and alert packets are generated if predetermined conditions are met. Furthermore, the rate at which this data is generated may be selectable and different condition detectors may generate data at different rates.

FIG. 12

Figure 12:
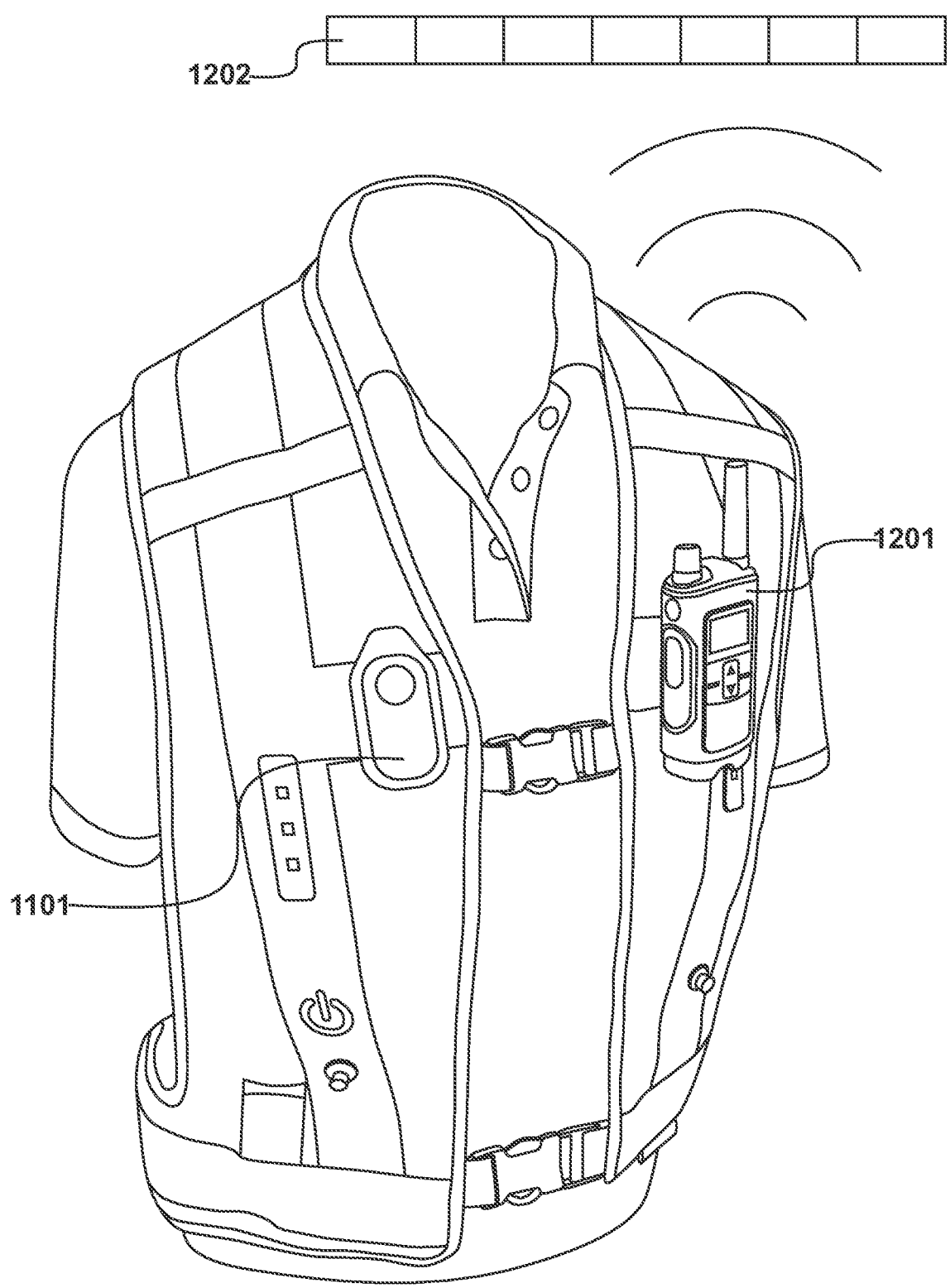
FIG. 12 shows the attachment of peripheral devices to the vest identified in FIG. 10.

The noise level detector 1101 is shown in FIG. 12, attached to the first rigid connector 1011. In addition, a radio device 1201 has been attached to the second rigid connector 1012. In this example, the non-cellular radio device 1201 is substantially conventional and operates within a non-cellular radio communication network, as described with reference to FIG. 13. In an embodiment, the non-cellular radio device 1201 is provided exclusively to meet the requirements of the present embodiment. However, in an alternative embodiment, it is also possible for the non-cellular radio device 1201 to be detached from the second rigid connector 1012, thereby allowing an operative to establish voice communications with supervisors. The non-cellular radio device 1201 therefore includes a local battery from which power is derived when communications of this type take place. In addition, when attached as illustrated in FIG. 12, the local battery may receive a trickle charge from the connected control unit.

The non-cellular radio device 1201 is provided with a connector interface that is substantially similar to connector interface 1102. In this way, it is possible for the non-cellular radio device 1201 to receive transferred condition data 1103 from the control unit and to transmit this condition data as transmitted condition data 1202 directly to a base station, without relying upon the transmission capabilities of the control unit itself. Thus, following an aspect of the present invention, it is possible for this secondary non-cellular radio communication facility to be deployed when cellular communication, as used by the control unit, becomes unavailable. In this way, even in areas where public cellular transmission networks are unavailable, it is still possible to maintain a communication channel between the operative's personal area network and the control station; thereby maintaining the wide area network.

The non-cellular radio communication device may operate in accordance with many known radio standards, including appropriately data-modulated analog systems—that is, convention frequency multiplexed amplitude or frequency modulated systems. However, increasingly, these are being replaced by digital system, including Wi-Fi, ZigBee, Bluetooth LE and LoRa.

FIG. 13

Figure 13:
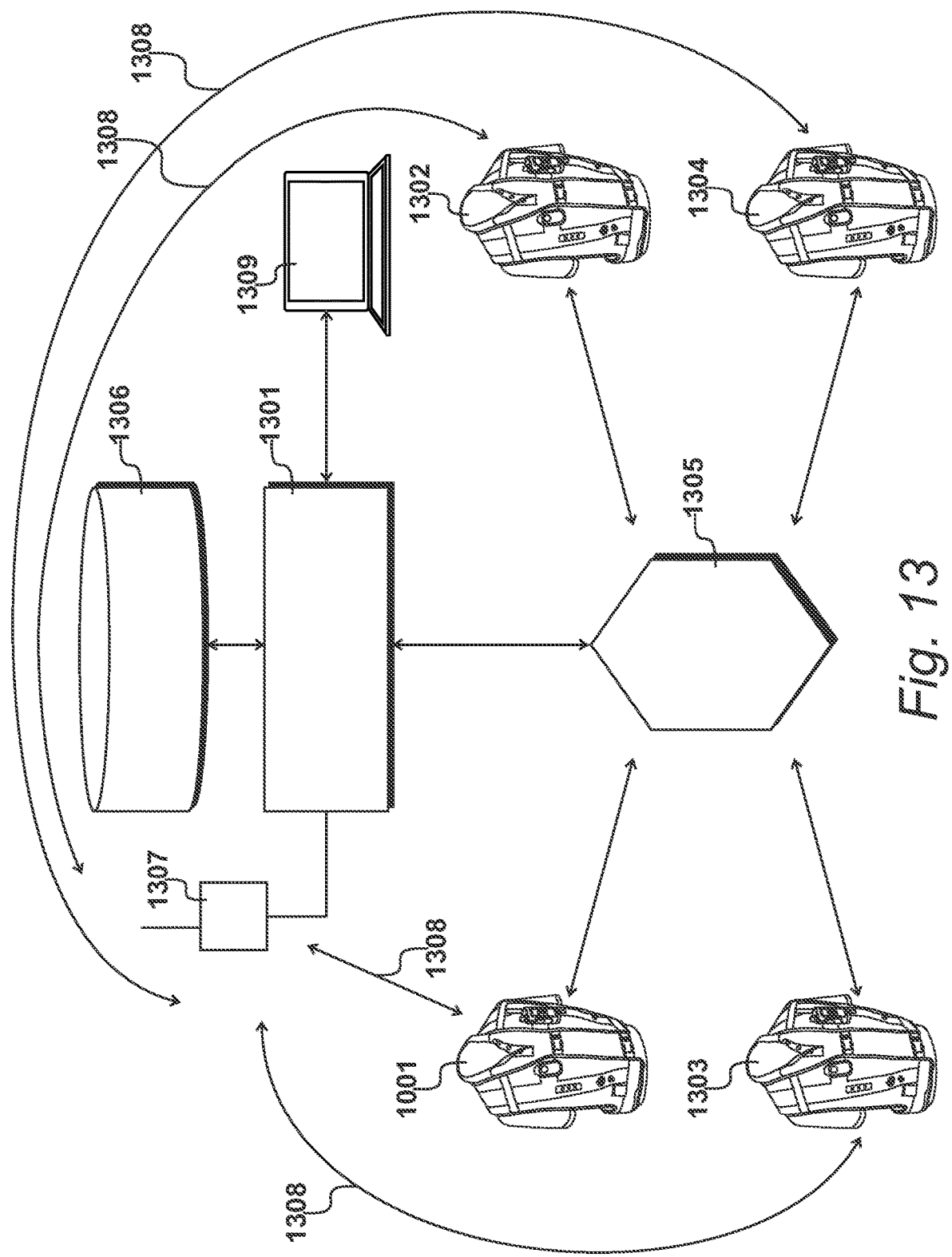
FIG. 13 shows an overall system for monitoring operatives in hazardous environments.

A system for monitoring operatives in hazardous environments is illustrated in FIG. 13. The system includes a base station 1301 and items of clothing, including a first item of clothing (implemented as vest 1001) along with a second item of clothing 1302, a third item of clothing 1303 and a fourth item of clothing 1304. Thus, in the system illustrated in FIG. 13, four items of clothing are shown but it should be appreciated that more or fewer items of this type or related types (such as the type illustrated in FIG. 4) may be included within the network.

The system also includes condition-detector devices of the type described with reference to FIG. 11, attachable to respective items of clothing for producing condition data 1103. Non-cellular radio communication devices are also provided that are attachable to respective items of clothing, such as non-cellular radio device 1201. Each control unit, connected to illuminatable devices by a wiring loom, communicates with the base station 1301 over a cellular radio network 1305. In an embodiment, this is a public network established for mobile telephony. During operation, heartbeat signals are maintained between each control unit and the base station. As used herein, this consists of periodically transmitting uplink signals from a control unit, via the cellular radio network 1305, to the base station 1301. Furthermore, this also includes periodically transmitting downlink signals from the base station 1301, via the cellular radio network 1305, to the control units operational within the environment.

When downlink signals are being received, control units transmit condition data 1103 to the base station 1301 in a predefined order, using an inbuilt cellular radio communication module. As previously described with reference to FIG. 6, this information is retained locally within a data storage device forming part of the loom and hence part of the wearable item of clothing, such that this data is then associated with the item of clothing and not with the control unit. However, the radio communication channels of the present invention also ensure that this data is provided in substantially real time to the base station 1301, such that it may then be stored in a database 1306 and when necessary, acted upon in real time.

Thus, the downlink signals confirm to the control unit that cellular radio communication is available and the communication of condition data is possible using this facility. Similarly, the uplink signal provides reassurance to supervisors at the base station 1301 that the control units can communicate and that the base station should be in a position to receive communicated condition data. However, if downlink signals are not being received by the control unit, the control unit transfers condition data to the connected non-cellular radio device 1201 over the wiring loom and the base station 1301 communicates with a private radio network transceiver 1307. Thus, when the downlink signals are not being received, the connected non-cellular radio device 1201 transmits condition data received from the control unit to the base station over the non-cellular radio network via transceiver 1307, as illustrated by arrows 1308.

In the system illustrated in FIG. 13, the base station includes a visual display device 1309 for displaying a graphical interface, as described with reference to FIG. 16.

FIG. 14

Figure 14:
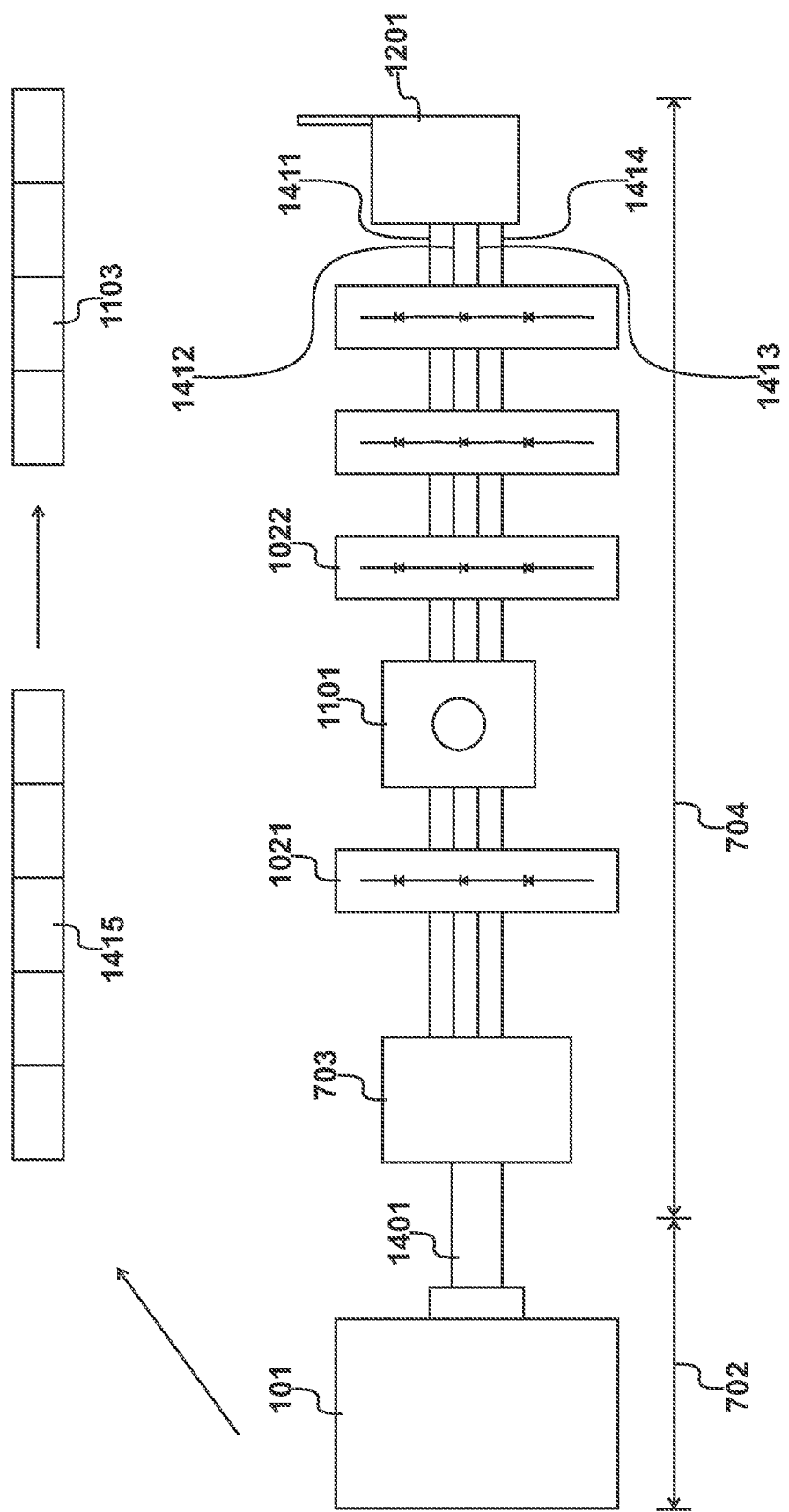
FIG. 14 shows a schematic representation of the personal area network established within the vest shown in FIG. 12.

A schematic representation of the personal area network established within the item of clothing, as described with reference to FIG. 12, is shown in FIG. 14. This may be considered as being defined by the extended loom portion 702 and the embedded loom portion 704. In this embodiment, the control unit 101 communicates with the encapsulated circuit 703 via a proprietary ten-wire communication ribbon cable 1401, that allows the control unit 101 to communicate with existing loom systems; and the control unit 101 includes stored instructions for a default mode of operation for deployment with these legacy systems. The encapsulated circuit 703 therefore provides an interface between the legacy ten-wire system and a four-wire system of the embedded loom portion 704.

Under standard operating conditions, the control unit 101 communicates with the base station 1301 via a cellular radio communications module, making use of a cellular radio network 1305. In an embodiment, a narrow-band cellular data system is adopted, such as LTE Cat M1. In accordance with established standards, the bandwidth of transmissions may be limited to a single narrow band of two hundred kilohertz, using OFDM modulation for downlink communication and SC-FDMA for uplink communication. In an embodiment, this is the only form of radio communication available to the control unit, with all other forms of communication taking place over the embedded loom.

The four-wire system of the embedded loom portion 704 may be implemented as a synchronous, multi-master, multi-slave, packet switched, single ended serial bus. In this embodiment, the serial bus consists of a first wire 1411 that may convey power, a second wire 1412 that may be grounded, a third wire 1413 that may provide serial data and a fourth wire 1414 that may provide a serial clock.

The noise level detector 1101 generates condition data 1103, representing measurements of conditions within the environment. This condition data is transmitted to the base station via the cellular radio communication module 202 if downlink signals are being received.

Packets of condition data 1103 are transmitted within the personal area network and the wide area network in accordance with message queuing telemetry transport (MQTT) working on top of a TCP/IP protocol. The data communication protocol operates with the relatively narrow bandwidth provided by the radio communication channels, given that these channels are only required for the transmission of relatively small quantities of data and are not used for broadband communications of, for example, voice and high bandwidth video.

Transmissions from the control unit 101 (sometimes referred to as a hub) to the base station 1301 usually consists of twenty to forty bytes, with additional padding from the MQTT protocol taking the packet size up to fifty to sixty bytes. Transmissions from the base station back to the hub tend to be bigger, particularly during initiation, given that settings data and information will be transmitted.

In this implementation, communication must be maintained, to ensure that the base station continues to receive heartbeat signals from the control unit, identified as the uplink signals herein.

In addition to transmitting condition data as defined herein, the control unit also sends operational data relating to the status of the system itself, irrespective of the external conditions of the environment. This operational data may include, non-exclusively, battery condition data, signal strength data, location data, accelerometer activation and activation of the illuminatable devices. Thus, during standard operation, the control unit 101 transmits condition data packets 1103 and operational data packets 1415.

In this way, the control unit provides regular messages as uploads to the base station 1301, with each stream having its own messages and repetition rate that may vary. These rates are also configurable. For example, location data may be required significantly more frequently than battery status data. In different environments, different transmission protocols may be available as a secondary backup. However, attempts to incorporate all of these possible protocols within the capabilities of the control unit itself places highly restrictive burdens upon the overall system design.

The control unit 101 therefore provides an apparatus for monitoring operatives in hazardous environments and supplies power to the personal area network by the inclusion of a rechargeable battery 206. The physical interface, implemented by wires 1411 to 1414, supplies power from this battery and facilitates communication. These data wires form part of a loom that is embedded within the item of clothing. The control unit includes a processing device implemented as a processor 201 along with a cellular radio communication module 202 for communicating with the base station 1301 over a cellular radio network 1305. The processing device transmits an uplink signal to the base station and monitors downlink signals received from the base station. Under standard operation, the processor 201 receives condition data from at least one condition detection device, such as the noise level detector 1101. This condition data is transmitted to the base station via the cellular radio communication module if the downlink signals are being received. However, if downlink signals are not being received, the condition data is transferred to the loom connected non-cellular radio device 1201.

FIG. 15

Figure 15:
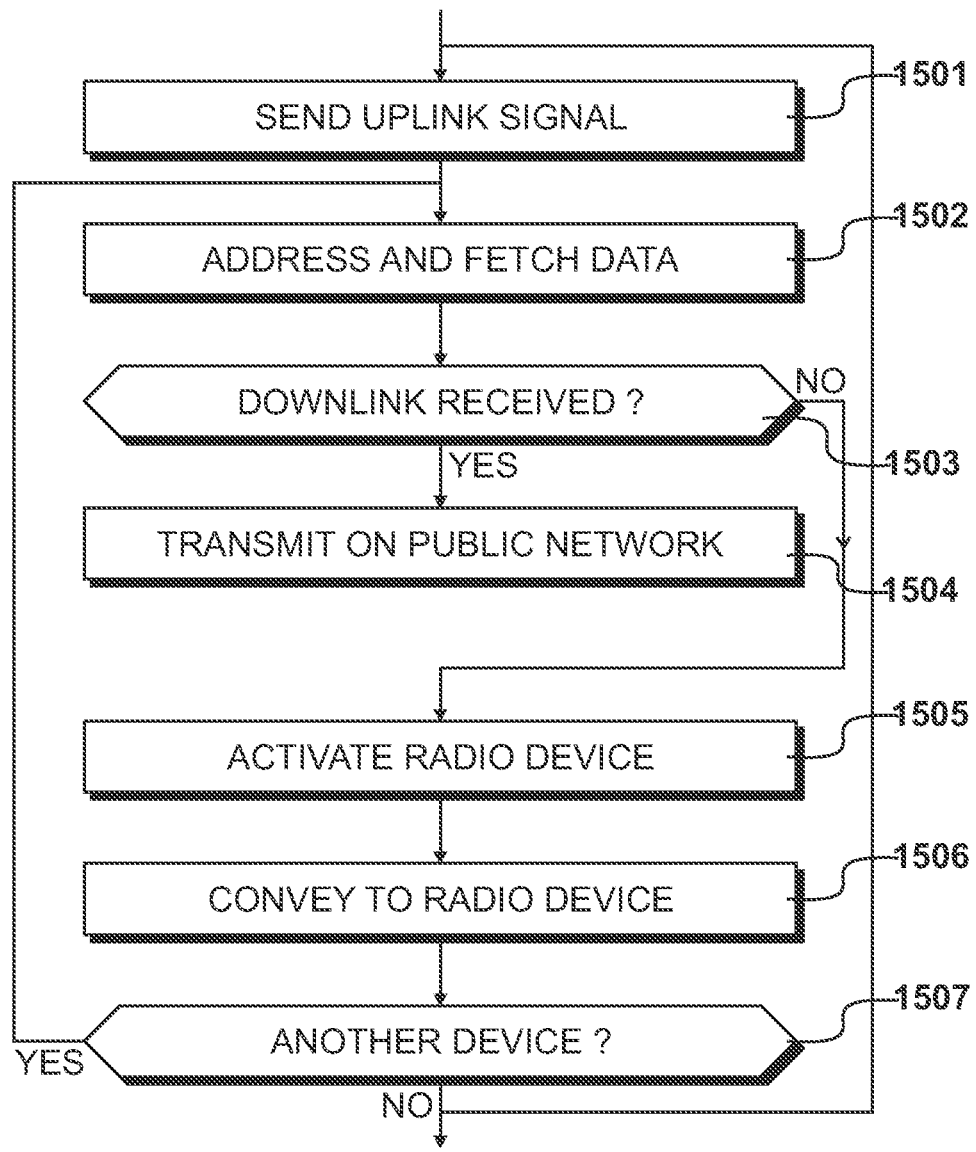
FIG. 15 shows procedures performed by a processor to implement an aspect of the present invention.

Procedures performed by the processor 201 in order to implement an aspect of the present invention, are illustrated in FIG. 15. At step 1501, an uplink signal is sent to the base station 1301, thereby maintaining a heartbeat and informing the base station that cellular data communication is available.

At step 1502, peripheral devices (such as the noise level detector 1101) are addressed and data is received over the loom wires.

At step 1503, a question is asked as to whether the downlink signal has been received from the base station 1301; again, confirming that the cellular network is functional. Thus, if the question asked at step 1503 is answered in the affirmative, a data packet is made available for transmission via the cellular radio network 1305.

If the question asked at step 1503 is answered in the negative, to the effect that the downlink signal has not been received, the non-cellular radio device 1201 is activated at step 1505. Upon being activated, the non-cellular radio device may be required to receive power from its own internal battery but remains attached to the loom in order to maintain data communication. Thus, at step 1506, the condition data is conveyed from the control unit 101 to the non-cellular radio device 1201, thereby allowing the radio device to complete the transmission to the base station via the private radio network 1307.

The method therefore provides for monitoring operatives in hazardous environments. The control unit 101 is connected to the wiring loom embedded within an item of clothing having illuminatable devices and interface connectors, as described with reference to FIG. 4. A monitoring device is connected to an interface connector, as described with reference to FIG. 12. Furthermore, a non-cellular radio device 1201 is also connected to an interface connector. Prior to use, the control unit 101 is activated by pressing the activation button 103 at the position of the activation indicator 1034. Upon activation, the control unit supplies power to the connected monitoring device and to the connected radio device, thereby directly facilitating operation from this power supply or using the power supply to trickle charge a local battery.

Condition data is conveyed from the monitoring device to the control unit and the control unit periodically transmits uplink signals to the base station via the public cellular network. Furthermore, the control unit periodically receives downlink signals. In this way, it is possible for the control unit to transmit the condition data over the public cellular network when the downlink signals are being periodically received. However, when these signals are not being received, the condition data is transferred to the radio device for transmission by the radio device to the base station via the private radio channel.

FIG. 16

Figure 16:
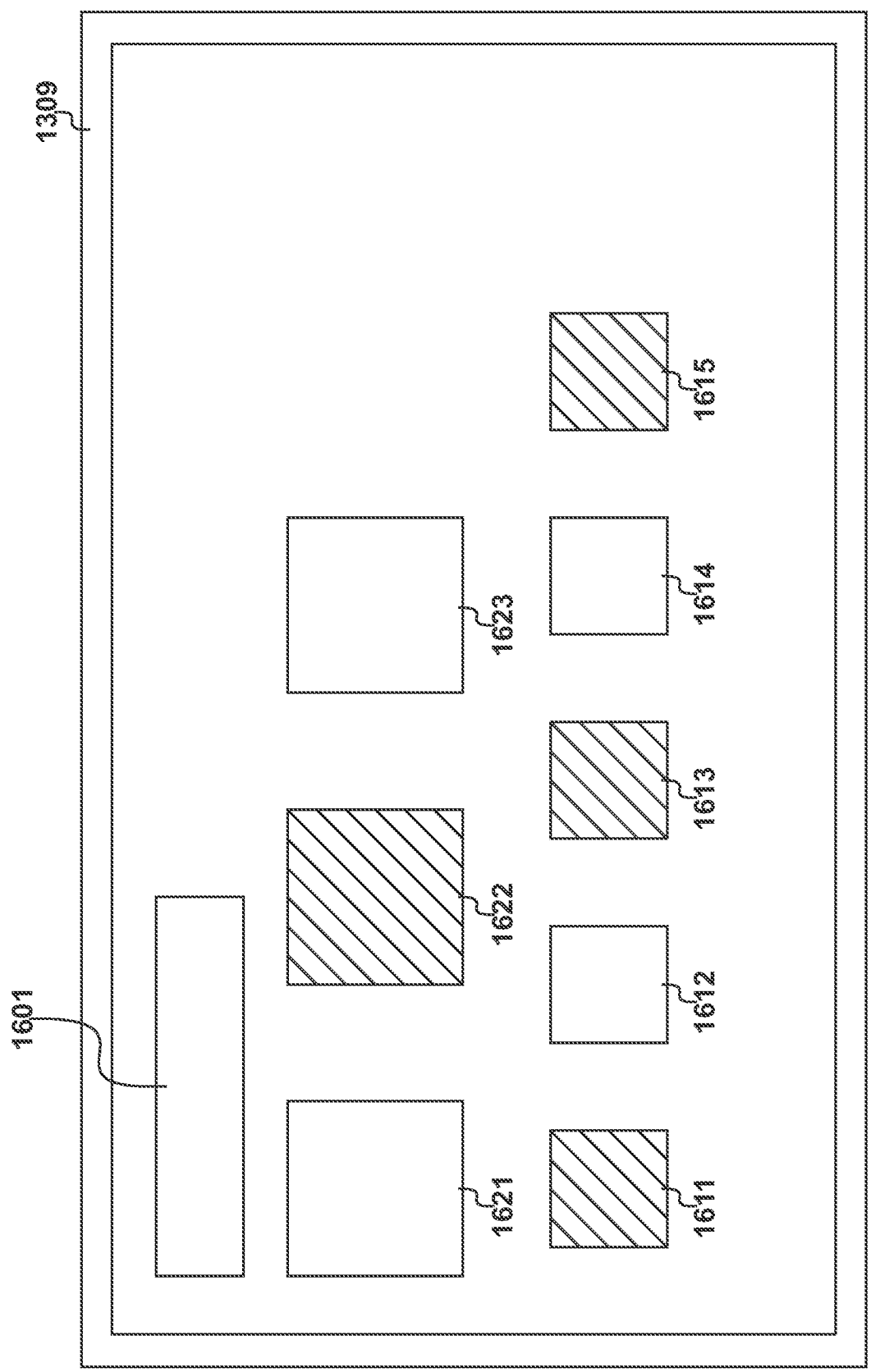
FIG. 16 shows a graphical display on a visual display device.

The visual display device 1309 is illustrated in FIG. 16, which is configured to display a graphical interface. A graphical interface of the type illustrated in FIG. 16 may be displayed for each operative working within the environment and the selected operative is identified by an operative identifier 1601. The graphical interface displays an indicator for each connected device. In this example, there is a first device indicator 1611, a second device indicator 1612, a third device indicator 1613, a fourth device indicator 1614 and a fifth device indicator 1615. These indicators remain relatively blank if a device is currently non-operational and then change their visual appearance when operations are being performed. Furthermore, in an embodiment, specific icons and numerical values may be included within the device indicators.

For the purposes of this illustration, active indicators are shown shaded. Again, for the purposes of illustration, it may be assumed that the first device indicator 1611 refers to the noise level detector 1101, the third device indicator 1613 refers to the non-cellular radio device 1201 and the fifth device indicator 1615 refers to the light emitting clusters (1021-1022). The second device indicator 1612 and the fourth device indicator 1614 relate to devices that could be attached, possibly via the third rigid connector 1013 and the fourth rigid connector 1014 but, on this particular shift, devices for these connectors have not been deployed.

The graphical display also includes a first communication indicator 1621, a second communication indicator 1622 and a third communication indicator 1623. In this example, the second communication indicator 1622 is shown as being active.

In this embodiment, the first communication indictor 1621 identifies the status of the primary communication channel invoked during standard operation via the cellular radio network 1305. Similarly, the second communication indicator 1622 represents communication by the secondary communication channel via the non-cellular network 1307. The third communication indicator 1623 indicates that communication has failed, which may in turn invoke an emergency condition. Thus, in this implementation, one and only one of the communication indicators will be active. Thus, the condition shown in FIG. 16, with the second communication indicator shown as active, informs supervisors that the primary (cellular) communication system has failed and data communication is now taking place via the secondary (non-cellular) communication system.

In some environments, this may be seen as normal, particularly when it is known that public cellular signals will be lost in regions of the environment. Alternatively, situations of this type may be unusual but a predefined period of time may be allowed during which this secondary communication is tolerated. During this secondary mode of data transmission, different procedures may be adopted by the control unit 101 to reduce the amount of data that is transmitted until the primary communication mode has been re-established.

In situations where communication via the secondary channel is preferred, the secondary channel may be selected by disabling the downlink signal.

The invention claimed is:

1. A system for monitoring operatives in hazardous environments, comprising:
   a base station;
   items of clothing with illuminatable devices connected to a control unit by a wiring loom;
   condition detection devices, each attachable to a respective item of clothing of said items of clothing for producing condition data; and non-cellular radio devices, each attachable to said respective item of clothing of said items of clothing, wherein:
said control units include a processor and a cellular radio communication module, said cellular radio communication module is configured to communicate with said base station over a cellular radio network to transmit uplink signals and receive downlink signals under control of said processor;
said condition detection devices supply said condition data to a connected control unit over said wiring loom;
said control units transmit said condition data to said base station when said downlink signals are being received, over said cellular radio network, via said cellular radio communication module;
said control units transfer said condition data to a connected non-cellular radio device over said wiring loom when said downlink signals are not being received;
said connected non-cellular radio devices transmit said condition data received from said control units to said base station over a non-cellular radio network;
said base station includes a visual display device for displaying a graphical interface;
said graphical interface displays an indicator for each connected device; and
an attribute of an indicator changes in a response to operational changes to said respective connected device.

2. The system of claim 1, wherein said attribute for said indicator for said control unit changes to an operational state selected from possible operational states, comprising:
primary communication via said cellular radio network;
secondary communication via said non-cellular radio network; and
a failure to communicate.

3. The system of claim 1, wherein said illuminatable devices are configured to:
receive power from said control unit;
receive color data from said control unit; and
receive cadence data from said control unit.

4. The system of claim 1, wherein said condition data represents conditions, said conditions including:
gas concentrations;
radio-activity;
noise levels;
temperature;
humidity; and
bio-medical conditions.

5. The system of claim 1, wherein said control units transmit operational data to said base station, said operational data representing:
battery condition;
signal strength;
location;
accelerometer activation; and
activation of said illuminatable devices.

6. An apparatus for monitoring an operative in a hazardous environment, comprising:
a battery;
a physical interface for supplying power from said battery to power-wires and for communicating via data-wires, wherein said power-wires and said data-wires define a wiring loom embedded within an item of clothing;
a processing device; and
a cellular radio communication module for communicating with a base station over a cellular radio network, wherein said processing device is configured to:
transmit uplink signals to said base station;
monitor downlink signals from said base station;
receive condition data from a condition detection device connected to said wiring loom;
transmit said condition data to said base station via said cellular radio communication module if said downlink signals are being received; and
transfer said condition data to a non-cellular radio device connected to the wiring loom if said downlink signals are not being received.

7. The apparatus of claim 6, wherein:
said battery is a rechargeable battery;
said physical interface is configured to be detached from said wiring loom to facilitate a re-charging operation;
a re-set procedure is performed during said re-charging operation; and
a configuration procedure is performed upon connection of said physical interface to said wiring loom, such that control units are not permanently assigned to a specific item of clothing.

8. The apparatus of claim 7, wherein:
said cellular radio communication module transmits packets of data to said base station; and
each transmitted packet is dedicated to a particular data source.

9. The apparatus of claim 8, wherein dedicated data packets are provided for operational data including:
battery condition data packets;
signal strength data packets;
location data packets;
accelerometer activation data packets; and
light emitting device activation data packets.

10. A method of monitoring operatives in hazardous environments, comprising the steps of:
connecting a control unit to a wiring loom embedded within an item of clothing, said control unit having a processing device and a cellular radio communication module, said item of clothing having illuminatable devices and interface connectors;
connecting a monitoring device to a first interface connector of said interface connectors;
connecting a non-cellular radio device to a second interface connector of said interface connectors;
activating said control unit, wherein said control unit supplies power to said connected monitoring device and to said connected non-cellular radio device;
conveying condition data from said connected monitoring device to said control unit;
periodically transmitting uplink signals from said control unit to a base station, via said cellular radio communication module;
periodically receiving downlink signals from said base station;
transmitting said condition data via said cellular radio communication module when said downlink signals are being received;
transferring said condition data to said connected non-cellular radio device when said downlink signals are not being received; and
transmitting transferred condition data from said connected non-cellular radio device to said base station.

11. The method of claim 10, further comprising the step of inserting said control unit into an internal pocket of said item of clothing.

12. The method of claim 10, wherein:
said control unit supplies power and control data to said illuminatable devices; and
said control data controls a color and a cadence of said illuminatable devices.

13. The method of claim 10, wherein:
said interface connectors are configured to provide a mechanically detachable electrical interface for equipment external to a surface of said item of clothing, while providing permanent electrical connections with said wiring loom internal to said item of clothing;
said interface connectors have a rigid component, having an external mechanical/electrical interface portion configured to extend externally through an orifice defined in said item of clothing, and an internal electrical interface portion;
a circuit board includes first contacts attachable to said internal electrical interface portion;
an over-moulding is configured to surround said circuit board; and
an attachment element attaches said over-moulding to an internal surface of said item of clothing.

14. The method of claim 10, wherein a battery is included in said control unit as a control-unit battery and said connected non-cellular radio device includes a radio-device battery, further comprising the steps of:
recharging said radio-device battery from said control-unit battery over said wiring loom; and
powering said connected non-cellular radio device from said radio-device battery when transmitting said transferred condition data.

15. The method of claim 14, further comprising the steps of:
detaching said connected non-cellular radio device from said second interface connector; and
invoking said detached non-cellular radio device for audio transmission by receiving power from said radio-device battery.

16. The method of claim 10, wherein said condition data comprises data selected from a list including:
gas concentration data;
radio-activity data; and
noise level data.

17. The method of claim 10, wherein said control unit transmits operational data to said base station and said operational data comprises data selected from a list including:
battery condition data;
signal strength data; and
location data.

18. The method of claim 17, wherein:
data types are transmitted in individual packets; and
a rate of packet generation is independently selectable for each data type.

19. The method of claim 18, wherein location data type packets of said operational data are transmitted at a higher rate than other operational data type packets of said operational data.

* * * * *